(12) United States Patent
Ishikura (10) Patent No.: US 11,461,418 B2
(45) Date of Patent: Oct. 4, 2022

(54) INFORMATION PROCESSING APPARATUS, METHOD, AND A NON-TRANSITORY COMPUTER-READABLE STORAGE MEDIUM FOR EXECUTING SEARCH PROCESSING

(71) Applicant: CANON KABUSHIKI KAISHA, Tokyo (JP)

(72) Inventor: Takeshi Ishikura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 16/821,751

(22) Filed: Mar. 17, 2020

(65) Prior Publication Data

US 2020/0301985 A1  Sep. 24, 2020

(30) Foreign Application Priority Data

Mar. 22, 2019 (JP) .............................. JP2019-055560

(51) Int. Cl.
| | | |
|---|---|---|
| *G06F 16/00* | (2019.01) | |
| *G06F 16/9535* | (2019.01) | |
| *G06F 16/9538* | (2019.01) | |
| *G06N 20/00* | (2019.01) | |
| *G06F 3/04855* | (2022.01) | |
| *G06F 16/908* | (2019.01) | |

(52) U.S. Cl.
CPC ...... *G06F 16/9535* (2019.01); *G06F 3/04855* (2013.01); *G06F 16/908* (2019.01); *G06F 16/9538* (2019.01); *G06N 20/00* (2019.01)

(58) Field of Classification Search
CPC ............. G06F 16/9535; G06F 16/9538; G06F 16/908; G06F 3/04855; G06N 20/00
See application file for complete search history.

(56) References Cited

U.S. PATENT DOCUMENTS

| | | | | |
|---|---|---|---|---|
| 10,056,078 | B1 * | 8/2018 | Shepherd | G06F 16/24578 |
| 2009/0187515 | A1 * | 7/2009 | Andrew | G06F 16/9535 707/E17.014 |
| 2012/0158685 | A1 * | 6/2012 | White | G06F 16/9535 707/723 |
| 2013/0246383 | A1 * | 9/2013 | White | G06F 16/9535 707/723 |
| 2014/0168120 | A1 * | 6/2014 | Lee | G06F 3/0488 345/173 |
| 2017/0098000 | A1 * | 4/2017 | Paris | G06F 16/9536 |

FOREIGN PATENT DOCUMENTS

JP   2018-190293 A   11/2018

* cited by examiner

*Primary Examiner* — Jared M Bibbee
(74) *Attorney, Agent, or Firm* — Canon U.S.A., Inc. IP Division (57) ABSTRACT

In an information processing apparatus having a platform supporting estimation processing using a model that has learned a relationship between data associated with user word and action and information to be used for search processing, in a case where the estimation processing is executed by using input data based on user input performed before usage of an application and the model, and an output estimation result is recorded, the application acquires the estimation result from the platform, executes search processing using information included in the estimation result, and provides the information using the result.

25 Claims, 11 Drawing Sheets

COLLECTING HISTORY INFORMATION

| TIME | FUNCTION INFORMATION | USER INFORMATION | POSITION INFORMATION | CONTENTS |
|---|---|---|---|---|
| 2019/2/25/0842 | OS ASSISTANT | userT[userT@mail.com] | home | DUNK SHOT |
| 2019/2/25/0835 | OS ASSISTANT | userT[userT@mail.com] | home | XXXX |
| 2019/2/25/0831 | AUDIO ASSISTANT COOPERATION SERVICE | userT[userT@mail.com] | home | LAST WEEK'S COLLECTION OF FINE PLAY IN BASKETBALL ... |
| 2019/2/24/2022 | APPLICATION B | userT | — | RECIPE FOR CHICKEN DISH |
| 2019/2/24/1225 | APPLICATION A | userT | — | |
| 2019/2/24/0825 | OS ASSISTANT | userT[userT@mail.com] | home | TODAY'S WEATHER ... |
| | . | | | |
| | . | | | |

FIG.4B

INPUT MANAGEMENT TABLE

| TIME | FUNCTION INFORMATION | INPUT DATA | POSITION INFORMATION |
|---|---|---|---|
| 2019/2/25/0843 | OS ASSISTANT | DUNK | home |
| 2019/2/25/0836 | OS ASSISTANT | MR./MS. XXXX | home |
| 2019/2/25/0831 | AUDIO ASSISTANT COOPERATION SERVICE | FINE PLAY | home |
| 2019/2/24/2030 | APPLICATION B | RECIPE FOR CHICKEN | — |
| 2019/2/24/0826 | OS ASSISTANT | WEATHER | home |
| | . | | |
| | . | | |

FIG.4C

PROFILE INFORMATION

| HOMETOWN | JAPAN |
|---|---|
| BIRTH DATE | 1990.11.11 |
| GENDER | MALE |
| INTEREST | BASKETBALL, JOGGING, COOKING |
| ADDRESS | TOKYO |
| OCCUPATION | ○○ CORPORATION |
| | . |
| | . |

FIG.6

| TIME | OUTPUT | INPUT |
|---|---|---|
| 2019/2/25/0845 | 2017/XX, BASKETBALL, COLLECTION OF FINE PLAY, BASKETBALL | DUNK, FINE PLAY |
| 2019/2/25/0845 | 2012/XX, 2017/ZZ | DUNK, MR./MS. XXXX |
| 2019/2/25/0837 | BASKETBALL, BASKETBALL, DUNK, BENEFACTOR | MR./MS. XXXX |
| 2019/2/25/0837 | 2012/XX, 2017/YY, 2017/ZZ, BASKETBALL, BASKETBALL | MR./MS. XXXX, FINE PLAY |
| 2019/2/25/0831 | SPORTS, BASKETBALL, COLLECTION OF FINE PLAY, BASKETBALL | FINE PLAY |
| | • | • |
| | • | • |

INFORMATION PROCESSING APPARATUS, METHOD, AND A NON-TRANSITORY COMPUTER-READABLE STORAGE MEDIUM FOR EXECUTING SEARCH PROCESSING

BACKGROUND

Field of the Disclosure

The present disclosure relates to a technique for improving usability of an application using results of machine learning.

Description of the Related Art

Conventionally, an application accepts an input operation from a user and provides information associated with the input operation. For example, input of a search word or image data allows display of a search result similar to the input.

A search technique using a machine learning technique is discussed in Japanese Patent Application Laid-Open No. 2018-190293. In Japanese Patent Application Laid-Open No. 2018-190293, a category to which a target extracted from a photographic image input into an application belongs is estimated by using a learning machine that has learned a relationship between a transaction target and a category to which the transaction target belongs. The transaction target is searched from an online mall using the estimated category and a feature amount of the transaction target.

In Japanese Patent Application Laid-Open No. 2018-190293, to obtain a search result, a photographic image has to be input. On the other hand, a user who conducts a search cannot input a suitable search condition into an application in some cases. In a case where past information and unknown information are desired to be retrieved, the user may not have suitable image data or may not be able to come up with a search word as a search condition. In such a case, it is occasionally cumbersome to think of a search condition suitable for the application.

Further, user who tries to conduct a search using the application might have given a word or made an action related to information to be a hint of a search target before and after the application is activated. However, in a case where such a word and an action have been already given or done by the user before the application is activated, the user has to set the information associated with the word and action as a search condition in the application after the application is activated. Even such an operation is occasionally complicated for the user.

SUMMARY

According to embodiments of the present disclosure, an information processing apparatus having a platform supporting estimation processing using a model that has learned a relationship between data associated with user word and action and information to be used for search processing, includes at least one memory storing instructions related to an application, and at least one processor, wherein the instructions, when executed by the at least one processor, cause the information processing apparatus to, in a case where the estimation processing is executed by using information included in an operation history based on at least one of user input performed on the information processing apparatus in the platform and the user input performed on a device communicable with the information processing apparatus via a network as input data, and an estimation result based on executed the estimation processing is recorded, acquire the estimation result from the platform, execute search processing using information included in the acquired estimation result, and provide information using a result of the search processing, wherein the application is permitted to use a result of the estimation processing by a user.

Further features of the present disclosure will become apparent from the following description of exemplary embodiments with reference to the attached drawings.

DESCRIPTION OF THE EMBODIMENTS

Figure 1:
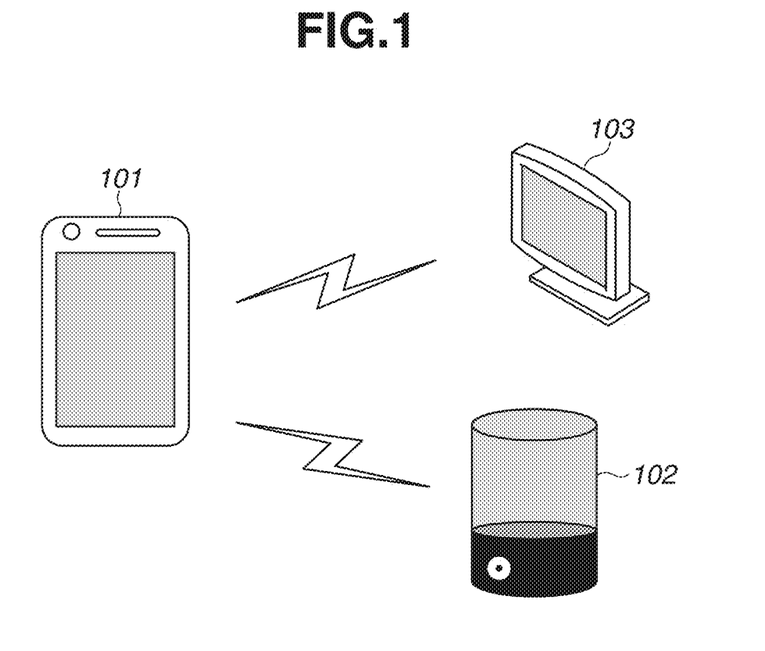
FIG. 1 illustrates an example of a system configuration.

FIG. 1 illustrates an example of a system configuration according to an exemplary embodiment.

Examples of a mobile device 101 include a smartphone, a tablet, a notebook computer, and a wearable terminal. An audio assistant terminal 102 accepts an audio input from a user and provides a search result acquired in response to the audio input. Examples of a peripheral device 103 include digital home appliances such as a television, a refrigerator, and a multifunction microwave oven, and in-vehicle terminals such as a vehicle navigation system.

The mobile device 101 is communicable with the audio assistant terminal 102 and the peripheral device 103 via a network. In the present exemplary embodiment, the communication is achieved by, for example, a wireless network such as Bluetooth®. In order to achieve the communication between devices, another connecting form may be used.

The mobile device 101 acquires information associated with audio input from a user through the audio assistant terminal 102 via the communication as occasion arises, and records the information as well as a time. The mobile device 101 acquires information, which is associated with audio input from a user, a function operation performed by the user, and position information about the user, from the peripheral device, 103 via the communication as occasion arises, and records the information together with a time.

Figure 2:
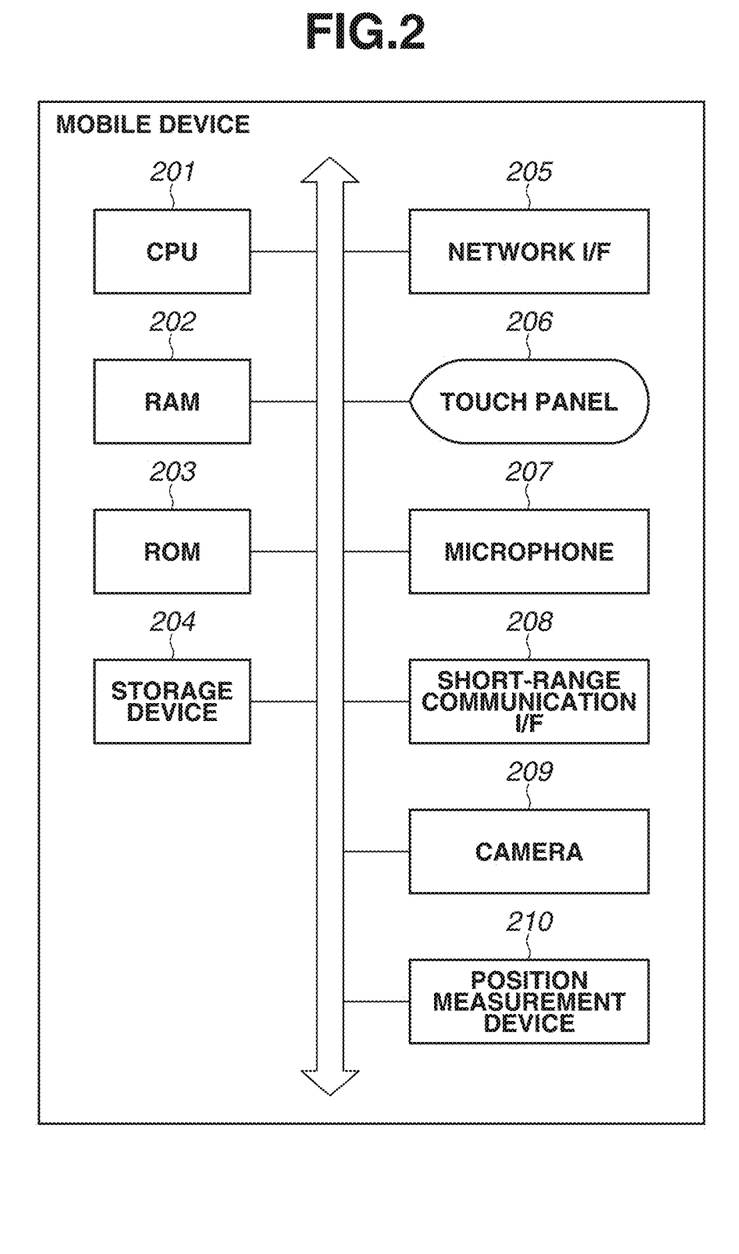
FIG. 2 is a diagram illustrating an example of a hardware configuration of a mobile device.

FIG. 2 is a diagram illustrating an example of a hardware configuration of an information processing apparatus such as the mobile device 101.

A central processing unit (CPU) 201 executes a program stored in a read only memory (ROM) 203, and programs of an operating system (OS) loaded into a random access memory (RAM) 202 from a storage device 204 and an application. That is, the CPU 201 executes the program stored in a readable storage medium to function as processing units that execute processing in flowcharts, described below. The RAM 202, which is a main memory of the CPU 201, functions as a work area, etc. A touch panel 206, which is an input unit of the mobile device 101, functions also as an input device. A display unit of the touch panel 206 displays, for example, a result of performing a function by the OS or an application. Further, in a case where a user operation on the touch panel 206 is detected, desired control is made by an associated program. Note that the input device of the mobile device 101 is not limited to the touch panel. For example, audio input is enabled by a microphone 207, and image input is enabled by a camera 209. Further, a position measurement device 210 such as a global positioning system (GPS) is also a position information input device.

A network interface (I/F) 205 is connected with a local network, and mutually communicates with a device connected with the network. A short-range communication I/F 208, which performs input and output through short-range communication such as Bluetooth® communication and near field communication (NFC), mutually communicates with a connected device. Respective components of the mobile device 101 are connected with an internal bus to be capable of communicating with each other.

The audio assistant terminal 102 and the peripheral device 103 also have hardware configurations equivalent to the hardware configuration of the mobile device 101. That is, the audio assistant terminal 102 and the peripheral device 103 each include at least a processor, a memory, a storage device, a network I/F, a short-range communication I/F, and a mechanism that accepts input. In the peripheral device 103, hardware according to an application purpose is further provided.

Figure 3:
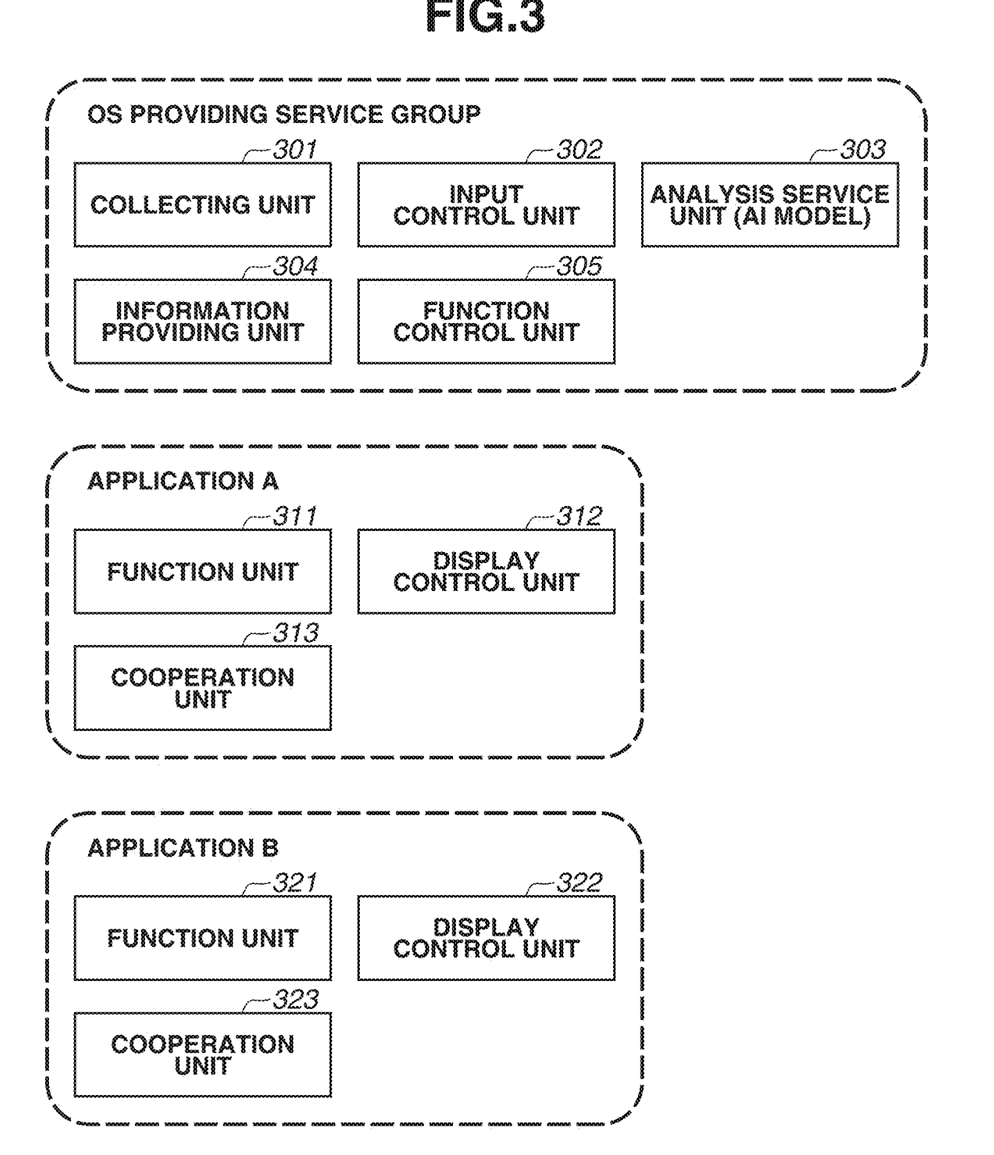
FIG. 3 is a diagram illustrating an example of a module configuration of software of the mobile device.

FIG. 3 is a diagram illustrating an example of a module configuration of software of the mobile device 101. The drawing illustrates entities of processing to be achieved by executing one or more programs such as the OS and the applications in the present exemplary embodiment.

A collecting unit 301, an input control unit 302, an analysis service unit 303, an information providing unit 304, and a function control unit 305 are modules associated with services provided by the OS.

The collecting unit 301 records contents of a user operation performed on the touch panel 206 or audio input by the microphone 207 together with a time (date) and position information when the user operation or the audio input is detected. Further, the collecting unit 301 requests the audio assistant terminal 102 and the peripheral device 103 for operation history information about the mobile device 101 or about a user (owner) of the mobile device 101, receives the information, and collects the information. The information is, as illustrated in FIG. 4A, managed by the storage device 204.

Note that the present exemplary embodiment includes the respective OS and applications installed in the mobile device 101, and combinations of thereof.

Figure 4A:
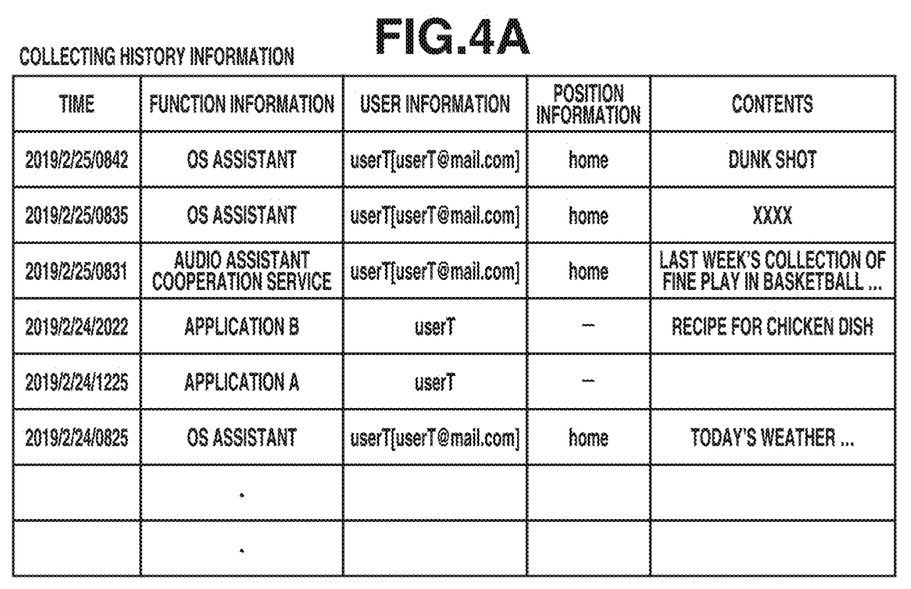
FIGS. 4A to 4C illustrate examples of data relating to input into a learned model.

FIG. 4A is a table in which information collected by the collecting unit 301 is stored. The information relates to a manual operation and an audio input operation performed inside and outside the mobile device 101 by a user. Applications that run on the OS are automatically recorded in a case where a user permits the OS to record an operation history at a time of installation. Operation histories of services outside the device can be acquired from the services only in a case where the services can cooperate with the OS and the user permits the cooperation. The table collectively manages histories recorded one by one in formats defined in respective applications and services. Contents include a time, function information (identification information about functions such as applications and services), user information, position information, and operation contents. Information to be collected by the collecting unit 301 may include broadcast program information and usage information provided by a television and a digital home appliance as the peripheral device 103.

The input control unit 302 converts the information collected by the collecting unit 301 into vectorized data to be input into the analysis service unit 303. The vectorized data is recorded in an input management table illustrated in FIG. 4B as occasion arises. For example, the collected information is converted or filtered to be input data. In a case where the analysis service unit 303 processes phrase-by-phrase input, the analysis service unit 303 divides information included in the operation contents in the histories into phrases. The analysis service unit 303 then extracts necessary information, such as nouns, excluding pronoun to generate input data. Further, the analysis service unit 303 occasionally uses position information as an additional parameter for analysis processing and estimation processing. Thus, also the position information is recorded. The input control unit 302 can operate in response to the collecting of the information performed by the collecting unit 301, but may operate asynchronously with the information collection.

Figure 4B:
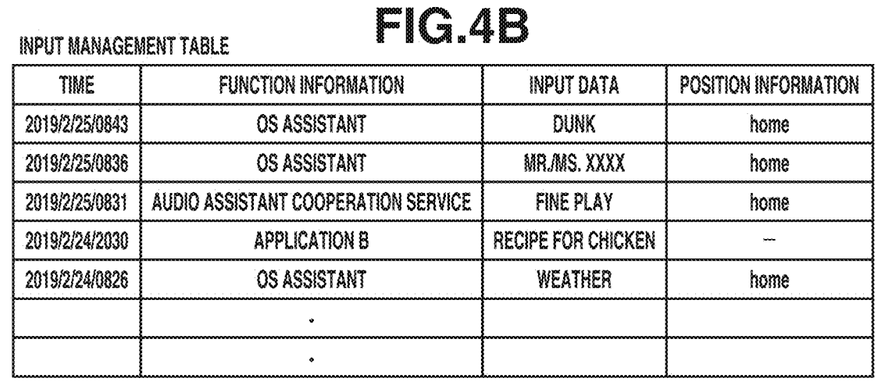

The analysis service unit 303 is a so-called artificial intelligence (AI) function for acquiring input data managed in FIG. 4B and executing the estimation processing using a learned model. The learned model used by the analysis service unit 303 executes the estimation processing using the position information associated with input of an analysis target or profile information about a user of the mobile device 101 as the parameter besides the input data managed in FIG. 4B.

Figure 4C:
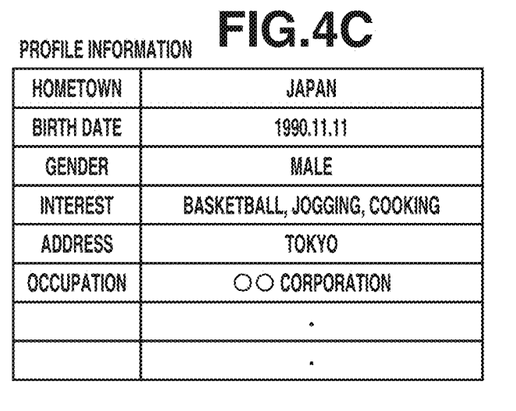

FIG. 4C illustrates profile information about a user registered in the mobile device the 101. The profile information includes a hometown, a birth date, a gender, an interest, an address, and an occupation. The profile information may optionally include a religion supported by the OS, and a community.

The analysis service unit 303 provided by the OS is communicable with a cloud service for reeducating the model via the network I/F 205. The cloud service is a platform prepared for achieving the processing at a learning stage of creating a model to be used by the analysis service unit 303. The learned model used in the present exemplary embodiment is a model which has been learned based on a lot of data of a predetermined format prepared by an input source capable of being supported by the OS. The learned model is for outputting a word to be a search word to be used in search for an application to run on the OS. The input source supported by the OS includes an OS assistant function for conducting a search based on audio input from a microphone provided by the OS, the audio assistant terminal 102 and the peripheral device 103 provided by a predetermined vendor. Profile information about a user managed by a service of the vendor providing the OS is also used for learning. Note that, in the present exemplary embodiment, a model is created by learning from a teacher using a support vector machine (SVM) in order to output a search word that enables acquisition of a suitable search result in response to the input. However, other various algorithms are applicable, and thus, for example, a neural network employing deep learning may be used.

The information providing unit 304 provides a result of the estimation processing executed by the analysis service unit 303 to a cooperating application. Information about an application that runs on the OS is provided only in a case where a user permits acceptance of a recommendation based on the estimation result from the analysis service unit 303 at the time of installation. Hereinafter, an application having an active analysis service cooperation function is considered to have been permitted by the user. The information providing unit 304 discloses an application programming interface (API) for providing the result of the estimation processing to the application upon activation of the application or reception of a request from the application.

The function control unit 305 activates the application upon reception of a user operation.

A function unit 311, a display control unit 312, and a cooperation unit 313, and a function unit 321, a display control unit 322, and a cooperation unit 323 are modules associated with services provided by two applications (application A and application B) that are installed to run on the OS, respectively.

The function units 311 and 321 provide individual functions of the applications, respectively. If the function units 311 and 321 are web browsers, they analyze Hypertext Makeup Language (HTML) documents related to websites to generate display images or execute scripts, respectively. If the function units 311 and 321 are applications for a social network or applications for exchanging messages, they acquire messages or user information chronologically managed to process the messages or the user information. The display control units 312 and 322 display processed results from the function units 311 and 321, respectively. The cooperation units 313 and 323 function based on user permission, and acquire information via the information providing unit 304. The acquired information is processed by the function units 311 and 321, and is displayed by the display control units 312 and 322, respectively.

Figure 5:
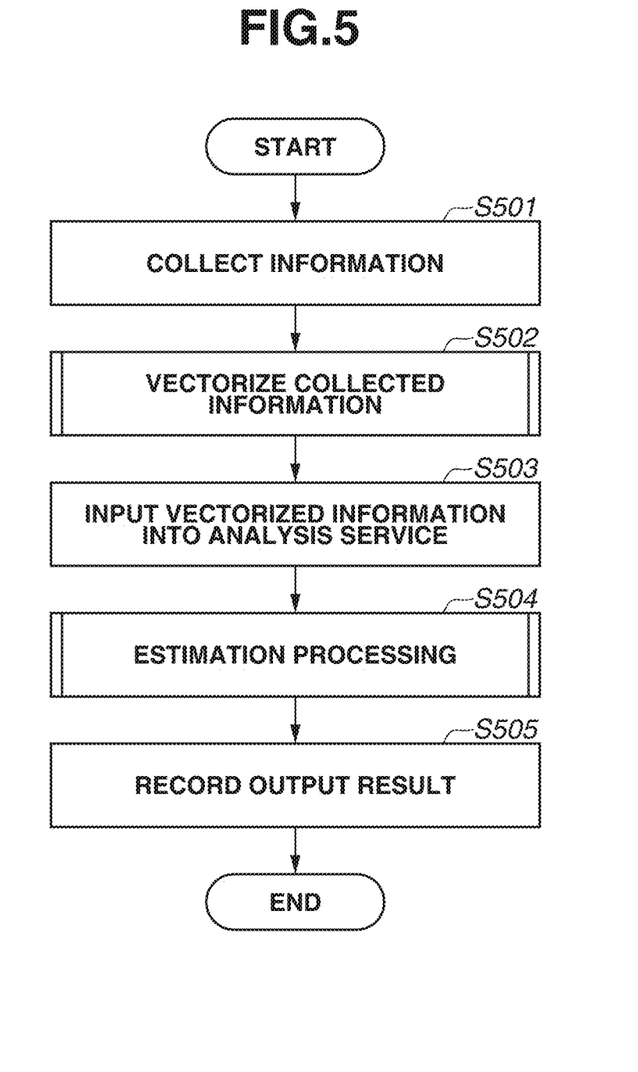
FIG. 5 is a flowchart illustrating a series of processing, which includes processing using the learned model, to be achieved by an operating system (OS) of the mobile device.

FIG. 5 is a flowchart describing a series of processing, which includes processing using the learned model, to be achieved by the OS of the mobile device 101. A program related to this processing is provided by installing the program on the OS to use the learned model. Note that the processing may be achieved by a program acquired from an outside via a network and additionally installed.

This processing is executed periodically, for example, every few minutes while the OS is operating. Further, the processing may be executed at any other timing, such as when a new operation history is recorded. The processing is automatically executed in the background asynchronously with processing to be executed by an application for which information is to be provided.

In step S501, the collecting unit 301 collects history data associated with a manual operation and an audio input operation performed by a user inside and outside the mobile device 101, and manages the history data as illustrated in FIG. 4A. The data to be collected includes, as described above, operation contents recorded by an operation performed by the user on the touch panel 206, audio input through the microphone 207, and cooperation devices (the audio assistant terminal 102 and the peripheral device 103) on the network.

In step S502, the input control unit 302 extracts an unprocessed record managed in FIG. 4A, and vectorizes data (contents) of the record. This is, as described above, processing executed by the input control unit 302 to perform input into the analysis service unit 303. Note that the collected information may be converted or filtered into input data. The information including the vectorized data is managed as illustrated in FIG. 4B.

In step S503, the input control unit 302 inputs the vectorized input data into the analysis service unit 303. At this time, besides input of input data of the latest record included in FIG. 4B, a plurality of different inputs may be performed in a manner that a plurality of new record input data is collectively input.

Figure 6:
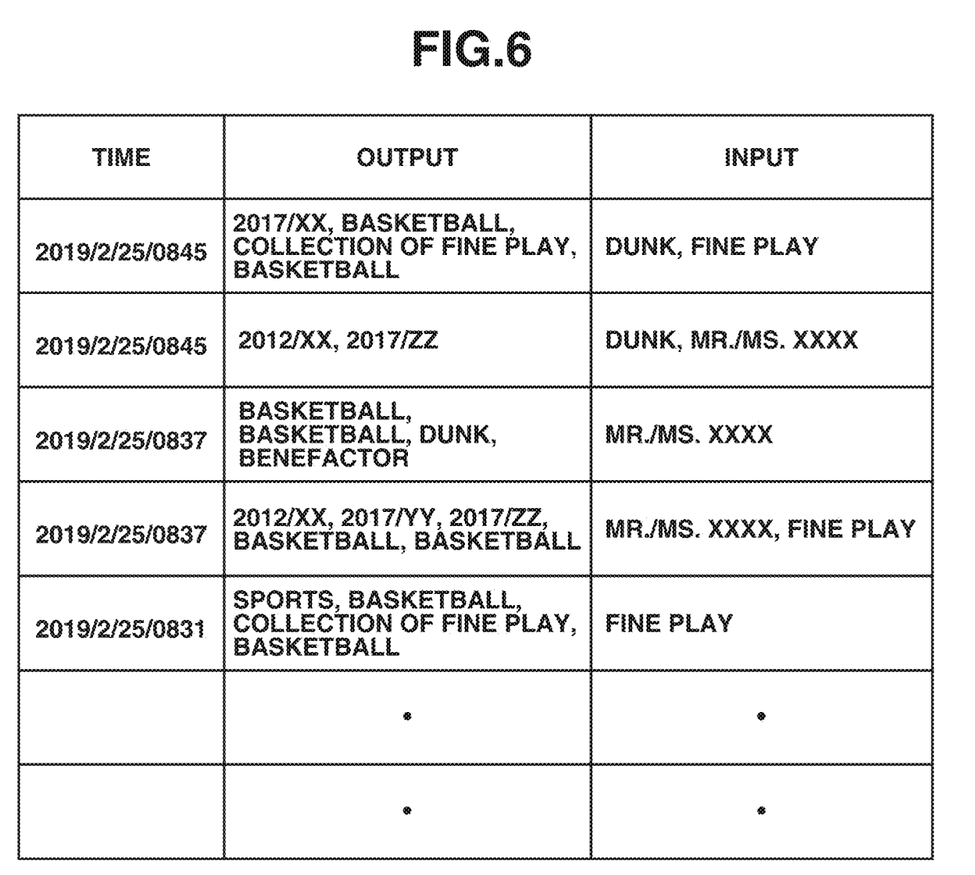
FIG. 6 illustrates an example of data relating to an output acquired by using the learned model.

In step S504, the analysis service unit 303 executes the estimation processing using the input data acquired from the input control unit 302 and the learned model. In step S505, the analysis service unit 303 records a result of the estimation processing in a table (FIG. 6) in the storage device 204. In FIG. 6, the result (output) of the estimation processing acquired by the analysis service unit 303, a time, and contents of associated input data are recorded.

The data recorded in FIG. 6 (particularly, the result as the output from the estimation processing) is provided to the application A and the application B by the information providing unit 304.

Figure 7A:
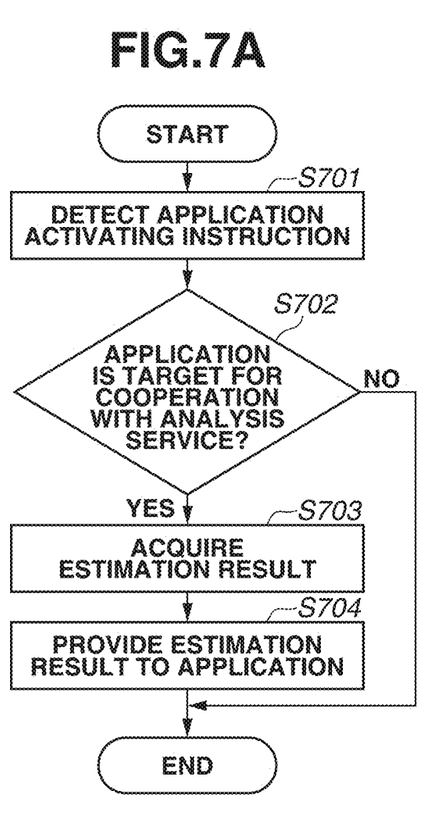
FIGS. 7A and 7B are flowcharts illustrating processing, which is achieved by the OS of the mobile apparatus, for providing an estimation result to an application.
Figure 7B:
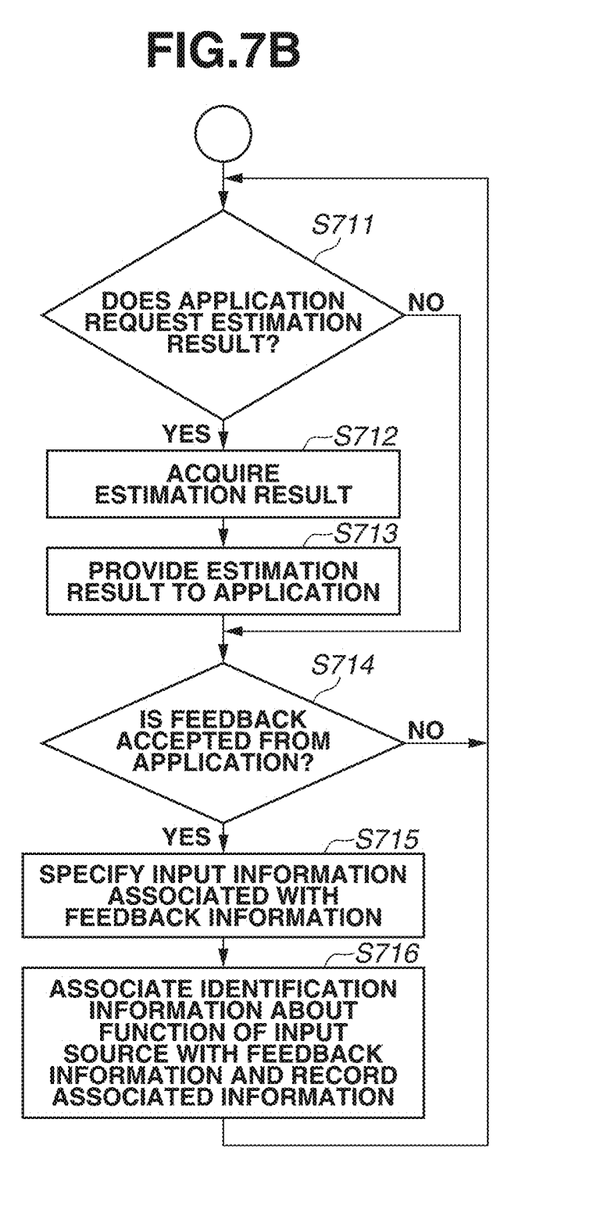

FIGS. 7A and 7B are flowcharts describing processing for providing an estimation result from the analysis service unit 303 achieved by the OS of the mobile device 101 to an application. To use the learned model, a program related to this processing is provided by being incorporated into the OS. Note that the processing may be achieved by an additionally installed program acquired from outside via a network.

FIG. 7A particularly illustrates the processing in a case where the function control unit 305 activates an application.

In step S701, the function control unit 305 detects an application activating instruction based on a user operation. In step S702, the function control unit 305 determines whether the analysis service cooperation function of the application, activating instruction for which has been detected, is active. If active (YES in step S702), the processing proceeds to step S703. If inactive (NO in step S702), the processing ends.

In step S703, the information providing unit 304 acquires an estimation result from the table illustrated in FIG. 6. One or more records are acquired within a predetermined time period after a current time. Note that at this time, information not provided to the application is managed, and only associated records may be acquired. In step S704, the information providing unit 304 provides information about the records acquired in step S703 as the estimation result to the application. When the information is provided, only contents included in the output managed in FIG. 6 may be provided.

Note that in step S704, the function control unit 305 is designed to deliver the information about the records acquired in step S703 as a parameter at the time of activating the application.

FIG. 7B illustrates particularly the processing in a case where the information providing unit 304 cooperates with an active application. In the mobile device 101, the information providing unit 304 is resident as a service, and executes the processing.

In step S711, the information providing unit 304 determines whether a request for the estimation result has been accepted from the application. If the request has been accepted (YES in step S711), the processing proceeds to step S712. If the request has not been accepted (NO in step S711), the processing proceeds to step S714.

In step S712, the information providing unit 304 acquires the estimation result from the table illustrated in FIG. 6, similarly to step S703. In step S713, the information providing unit 304 provides the acquired information about the records as the estimation result to the application, similarly to step S704.

In step S714, the information providing unit 304 determines whether feedback from the application has been accepted. The feedback indicates that the estimation result provided as information has been used. If the feedback has been accepted (YES in step S714), the processing proceeds to step S715. If has not been accepted (NO in step S714), the processing proceeds to step S711.

In step S715, the information providing unit 304 specifies, with reference to FIG. 6, input data that has been input into the analysis service unit 303 when the estimation result used by a user included in the feedback has been acquired. Further, the information providing unit 304 specifies identification information about a function, which is an input source of the specified input data, with reference to FIG. 4B. In step S716, the information providing unit 304 records, in the storage device 204, the identification information about the specified function in association with the accepted feedback information.

The recorded data is provided to the cloud service for reeducating the above-described model via the OS. The reeducated, the learned model can be downloaded and installed at a timing of updating the OS.

Figure 8:
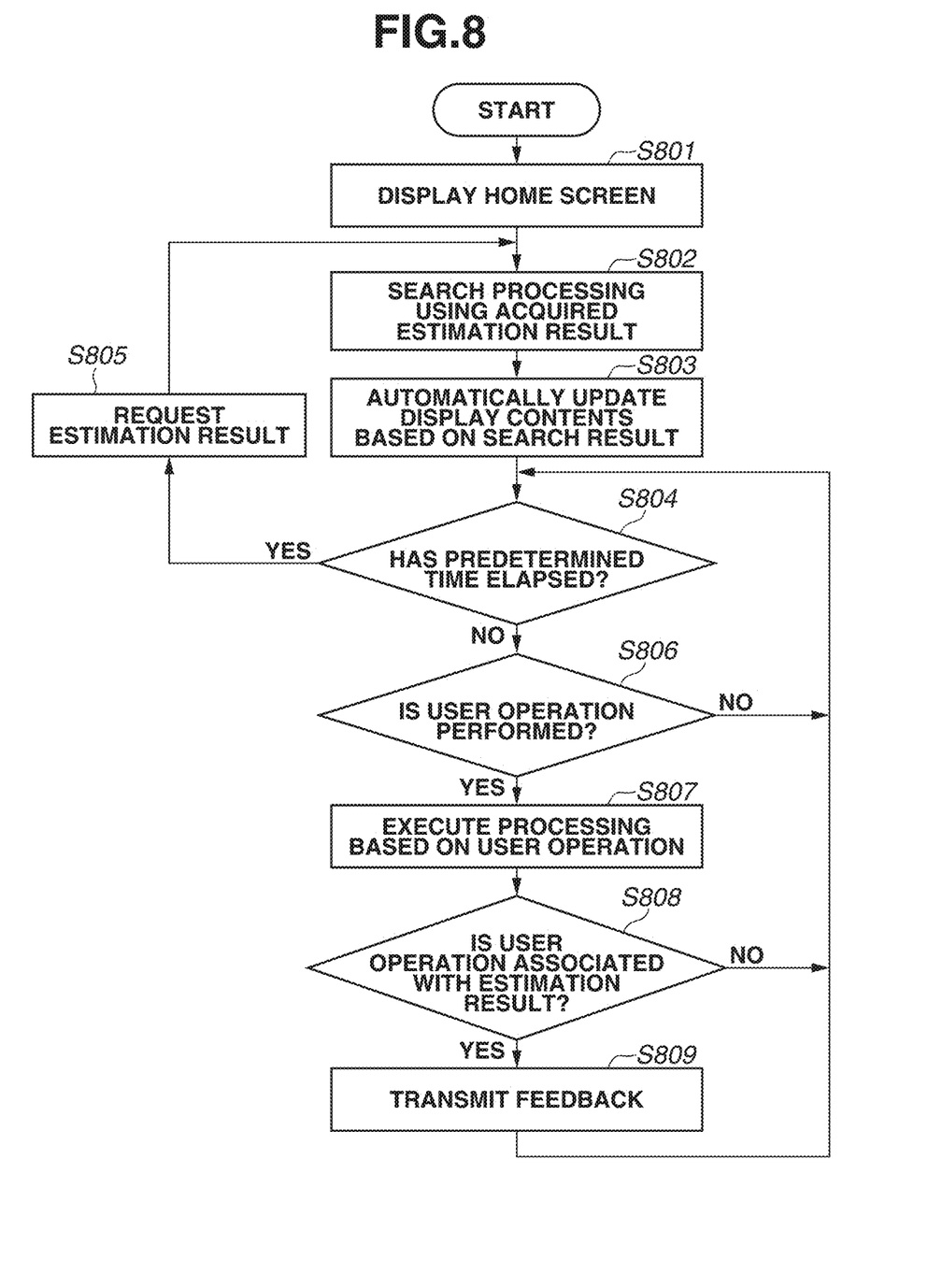
FIG. 8 is a flowchart illustrating processing to be achieved by an application that accepts information provided by the OS.

FIG. 8 is a flowchart illustrating processing to be achieved by an application that receives information from the information providing unit 304. Herein, processing in a case where the application A whose analysis service cooperation function is active runs will be described.

In step S801, the display control unit 312 displays a home screen of the application A based on the application activating instruction provided by a user operation.

In step S802, the function unit 311 executes the search processing using the estimation result provided by the information providing unit 304. Specifically, the search processing is executed by using words such as "basketball" and "collection of fine play" included in the estimation result to automatically retrieve users who perform related posting. The search may be conducted by the function unit 311 based on the provided estimation result using AND or OR. Further, the search may be conducted after the estimation result is partially selectively extracted based on a search target of the application A or the search result acquired by using OR. The search target may be in an external area connected via the network.

In step S803, the display control unit 312 automatically updates display contents upon reception of the search result from the function unit 311.

Figure 9:
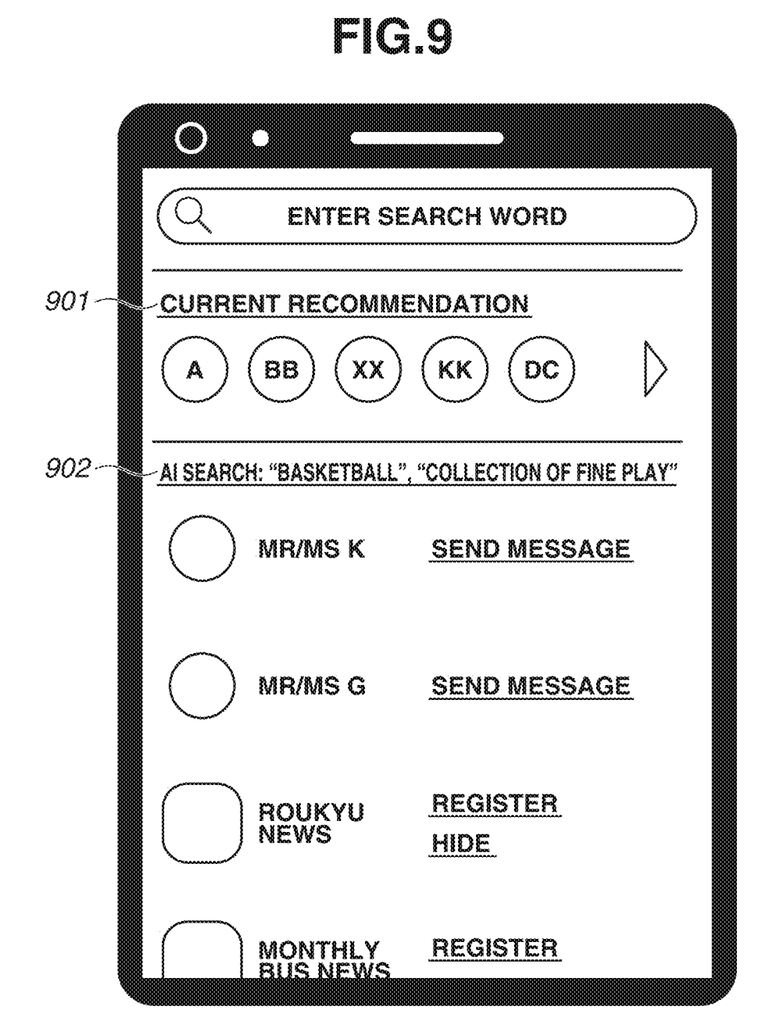
FIG. 9 illustrates an example of a screen to be provided by an application in an exemplary embodiment.

FIG. 9 illustrates an example of a screen of the application A to be provided by the mobile device 101 after the updating. A display 901 indicates objects which have been acquired by the application A via the network and to which many other users are currently paying attention. A display 902 indicates a result of the search processing using the estimation result provided by the information providing unit 304 as "AI search". The display 902 indicates a processing result desired by the user for the application A. The processing result has been acquired by the estimation result, which has been acquired from a history associated with a word and an action of the user during a time period before and immediately after the activation of the application A and is output from the OS, and by the action such as the activation of the application A.

In step S804, the function unit 311 determines whether a predetermined time has elapsed after the processing in step S802 has been executed last time. If the predetermined time has elapsed (YES in step S804), the processing proceeds to step S805. If the predetermined time has not elapsed (NO in step S804), the processing proceeds to step S806. In step S805, the cooperation unit 313 requests the information providing unit 304 for the estimation result. When the estimation result is accepted, the processing in and after step S802 is again executed. The function unit 311 may skip the search processing in step S802 and the updating processing in step S803 if no difference is present in the estimation result. Steps S804 and S805 enable the latest estimation result acquired by the analysis service unit 303 to be applied to the application.

In step S806, the function unit 311 determines whether a user operation has been performed on the screen provided by the application A. If the user operation has been performed (YES in step S806), the processing proceeds to step S807. If not (NO in step S806), the processing returns to step S804.

In step S807, the function unit 311 executes processing based on the user operation. Specifically, in a case where the objects and links included in the display 901 and the display 902 are specified, display switching and processing for information provision are performed based on the specification.

In step S808, the function unit 311 determines whether the user operation caused by the processing in step S807 is associated with the estimation result received from the information providing unit 304. For example, in a case where the objects or the links included in the display 902 are specified, the determination is made that the user operation associated with the estimation result has been performed. If the user operation has been associated with the estimation result (YES in step S808), the processing proceeds to step S809. If not (NO in step S808), the processing returns to step S804. In step S809, the cooperation unit 313 transmits feedback including the estimation result associated with the user operation to the information providing unit 304.

Figure 10:
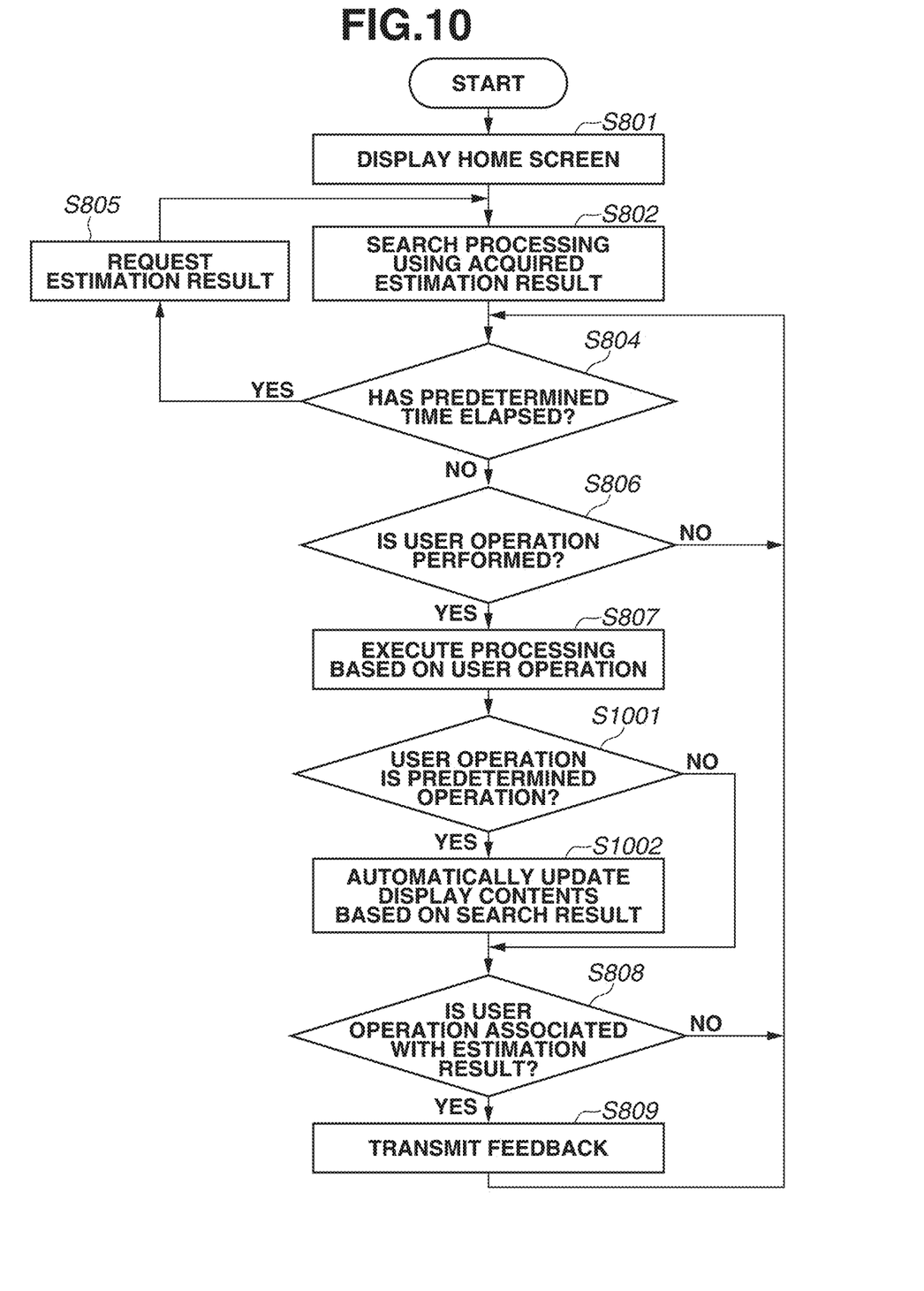
FIG. 10 is a flowchart describing processing to be achieved by an application in an application example.

A first application example will be described. FIG. 10 illustrates an application example in a case where the flowchart in FIG. 8 described in the above exemplary embodiment is applied to another application. In FIG. 10, the steps identical to the steps in FIG. 8 are denoted by identical step numbers, and the description thereof will be omitted. Difference and effects will be described below.

In step S1001, the function unit 311 determines whether the processing executed in step S807 has been a predetermined user operation. If the processing has been the predetermined user operation (YES in step S1001), the processing proceeds to step S1002. If the processing has not been the predetermined user operation (NO in step S1001), the processing proceeds to step S808.

Specific examples of the predetermined user operation are a scrolling operation to be achieved by a flick operation and an operation on display objects associated with the search function.

Specifically, in a case where an active application is an application that displays messages posted by users on a timeline in chronological order, a user scrolls the messages on the screen by the flick operation, not a swipe operation.

At this time, the user who has performed the flick operation is considered to desire to see a message or image data posted in the comparatively distant past. In a case where the user sees data of several years or several decades ago, the data is retrieved by the user repeatedly flicking the screen to perform the scrolling operation.

Further, in a case where the operation has been performed for display objects associated with a search function provided in advance in any application, the intention of a user who desires to conduct a search using a specific search function can be grasped.

The present application example allows a user to use the estimation result provided by the information providing unit 304, taking into account such an intention of the user.

In step S1002, the function unit 311 executes the search processing using the estimation result provided by the information providing unit 304, and automatically updates the display contents with search result being reflected to the display contents.

Figure 11A:
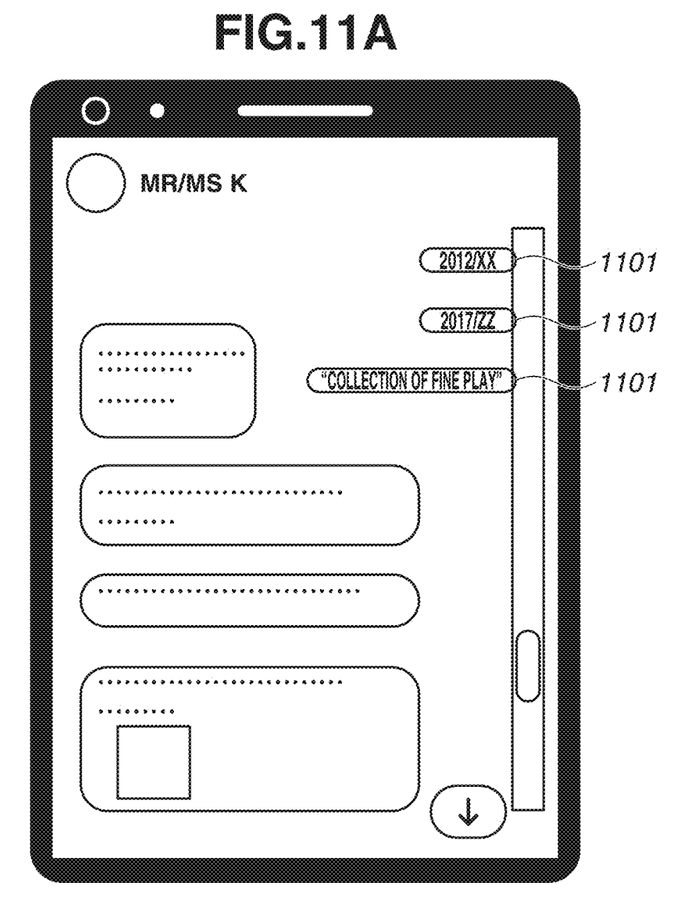
FIGS. 11A and 11B illustrate examples of screens to be provided by an application in the application example.

FIG. 11A illustrates an example of a screen provided by an application for displaying messages posted by users on a timeline in chronological order. The processing in step S1002 is reflected to the screen.

Objects 1101 on this screen indicate additional objects for jumping to time information or a message associated with a search result from data included in the estimation result, from among a plurality of messages included in a scrolling destination of a scroll bar. While performing the flick operation, the user can select any one of the objects 1101 that automatically appear, which may result in display of a desired message. Alternatively, as the scrolling destination of a little operation by the user, the function unit 311 controls to display a message associated with the search result.

Further, in a case where the message associated with the search result in step S1002 is included in the plurality of messages to be displayed during the screen scrolling by the flick operation, the scrolling can be stopped with the message being displayed. As a result, the user is prevented from skipping the message.

Figure 11B:
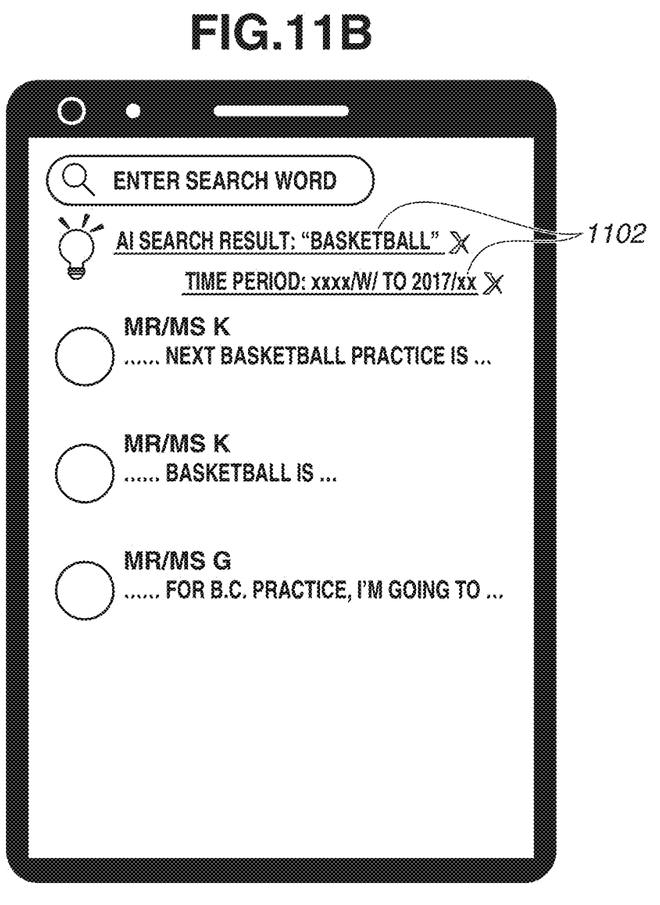

FIG. 11B illustrates an example of a screen to which the processing in step S1002 has been reflected in a case where the user has selected a specific search function on an active application.

In FIG. 11B, besides an input field where a user can enter any search word, a result of "AI search" acquired by using the estimation result provided by the information providing unit 304 is displayed as a display 1102. Herein, an automatic search has been conducted based on a word search and a time period (from the current time to the time included in the estimation result). The user can perform additional operations such as an operation for additionally entering a search word into the input field and an operation for deleting a search word "AI search".

In the present application example, in addition to the predetermined operation performed on the application by the user, the above-described estimation result is automatically applied. Accordingly, a search target desired by the user is likely to be immediately provided. In the present application example, user actions such as visually looking for a search target and inputting an appropriate search word the user comes up with might be omitted.

A second application example will be described. The above-described OS further includes a reporting function and a bias adjustment function.

The reporting function is for presenting the grounds for the learned model to derive an output from input data in the estimation processing. For example, in a case where one output is selected, input data and parameters that serve as the grounds for obtaining the output are listed. The extent to which the listed data influence deriving of the output can be displayed.

The bias adjustment function is a function for detecting a tendency that an undesirable output is likely to be obtained for a predetermined input in the estimation processing using the learned model, and notifying of this situation. Further, in this function, a conversion rule is set for the input control unit 302. This conversion rule is for reflecting a reverse bias for acquiring an estimation result desired by a user based on a user instruction to the predetermined input. In a case where this setting is made, hereinafter, at least a part of input information is changed and is used for the learned model according to the conversion rule if the predetermined input is accepted.

A third application example will be described. The present disclosure includes an apparatus or a system configured by suitably combining the above-described exemplary embodiments, and a method therefore.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-055560, filed Mar. 22, 2019, which is hereby incorporated by reference herein in its entirety.

What is claimed is:

1. An information processing apparatus having a platform supporting estimation processing using a model that has learned a relationship between data recorded based on words and actions of a user and information to be used for search processing, the information processing apparatus comprising:
- at least one memory storing instructions related to an application; and
- at least one processor, wherein the instructions, when executed by the at least one processor, cause the information processing apparatus to:
  - acquire an estimation result based on the estimation processing from the platform;
  - execute search processing using information included in the acquired estimation result; and
  - provide information using a result of the search processing,
  - wherein usage of an estimation result of the estimation processing by the application is permitted by the user, and
  - wherein, in the platform, so that the estimation result can be provided to applications installed in the information processing apparatus, the estimation result has been recorded based on the estimation processing that has been executed by using, as input data, data included in operation history information of the user.

2. The information processing apparatus according to claim 1, wherein the platform is provided as an operating system.

3. The information processing apparatus according to claim 1, wherein the model is installed in the information processing apparatus to be used by the platform.

4. The information processing apparatus according to claim 1,
- wherein the instructions, when executed by the at least one processor, further cause the information processing apparatus to request the platform for the estimation result, and
- wherein in response to the request, the application acquires the estimation result.

5. The information processing apparatus according to claim 4, wherein the platform is requested for the estimation result periodically.

6. The information processing apparatus according to claim 1, wherein the estimation result is acquired from the platform at a time of activating the application.

7. The information processing apparatus according to claim 1, wherein the instructions, when executed by the at least one processor, further cause the information processing apparatus to transmit feedback including the estimation result to the platform in a case where a user operation associated with the result of the search processing using the information included in the estimation result is accepted by the application.

8. The information processing apparatus according to claim 1,
- wherein the search processing using the information included in the estimation result is executed on a search target associated with a predetermined operation in a case where the predetermined operation performed by a user is detected, and
- wherein the contents to be provided are updated by using a result of the search processing.

9. The information processing apparatus according to claim 8, wherein the predetermined operation includes a scrolling operation to be achieved by a flick operation, and display is performed by using the result of the search processing as a scroll destination.

10. The information processing apparatus according to claim 1, wherein the device communicable via the network is at least any one of an audio assistant terminal, a digital home appliance, and an in-vehicle terminal.

11. The information processing apparatus according to claim 1, wherein the user input includes audio input.

12. The information processing apparatus according to claim 1, wherein the operation history information is recorded based on at least one of user input performed on the information processing apparatus and user input performed on a device communicable with the information processing apparatus via a network.

13. A method for an application installed in an information processing apparatus having a platform supporting estimation processing using a model that has learned a relationship between data recorded based on words and actions of a user and information to be used for search processing, the method comprising:
- acquiring an estimation result based on the estimation processing from the platform;
- executing search processing using information included in the acquired estimation result; and
- providing information using a result of the search processing,
- wherein usage of an estimation result of the estimation processing by the application is permitted by the user, and
- wherein, in the platform, so that the estimation result can be provided to applications installed in the information processing apparatus, the estimation result has been recorded based on the estimation processing that has been executed by using, as input data, data included in operation history information of the user.

14. The method according to claim 13, wherein the platform is provided as an operating system.

15. The method according to claim 13, wherein the model is installed in the information processing apparatus to be used by the platform.

16. The method according to claim 13, further comprising:
- requesting the platform for the estimation result; and
- acquiring the estimation result in response to the request.

17. The method according to claim 16, wherein the platform is requested for the estimation result periodically.

18. The method according to claim 13, wherein the estimation result is acquired from the platform at a time of activating the application.

19. The method according to claim 13, further comprising transmitting feedback including the estimation result to the platform in a case where a user operation associated with the result of the search processing using information included in the estimation result is accepted.

20. The method according to claim 13,
- wherein the search processing using the information included in the estimation result is executed on a search target associated with a predetermined operation in a case where the predetermined operation performed by the user is detected, and
- wherein contents to be provided are updated by using a result of the search processing.

21. The method according to claim 20, wherein the predetermined operation includes a scrolling operation to be achieved by a flick operation, and display is performed by using the result of the search processing as a scroll destination.

22. The method according to claim 13, wherein the device communicable via the network includes an audio assistant terminal, a digital home appliance, and an in-vehicle terminal.

23. The method according to claim 13, wherein the user input includes audio input.

24. The method according to claim 13, wherein the operation history information is recorded based on at least one of user input performed on the information processing apparatus and user input performed on a device communicable with the information processing apparatus via a network.

25. A non-transitory computer-readable storage medium having computer executable instructions stored thereon, wherein the instructions are related to an application and the instructions, when executed by one or more processors of an information processing apparatus having a platform supporting estimation processing using a model that has learned a relationship between data recorded based on words and actions of a user and information to be used for search processing, cause the information processing apparatus to:

acquire an estimation result based on the estimation processing from the platform;

execute search processing using information included in the acquired estimation result; and provide information using a result of the search processing, wherein usage of an estimation result of the estimation processing by the application is permitted by the user, and wherein, in the platform, so that the estimation result can be provided to applications installed in the information processing apparatus, the estimation result has been recorded based on the estimation processing that has been executed by using, as input data, data included in operation history information of the user.

* * * * *